US009917442B2

United States Patent
Beauregard et al.

(10) Patent No.: US 9,917,442 B2
(45) Date of Patent: Mar. 13, 2018

(54) DISTRIBUTED MICRO-GRID CONTROLLER

(71) Applicant: Prolucid Technologies Inc., Mississauga (CA)

(72) Inventors: Graham Beauregard, Ontario (CA); Tarun Tuli, Georgetown (CA); Robert Leigh, Toronto (CA); Jan Bergstrom, Elora (CA)

(73) Assignee: Prolucid Technologies Inc., Mississauga (CA)

( * ) Notice: Subject to any disclaimer, the term of this patent is extended or adjusted under 35 U.S.C. 154(b) by 270 days.

(21) Appl. No.: 14/774,213

(22) PCT Filed: Mar. 12, 2014

(86) PCT No.: PCT/US2014/023991
§ 371 (c)(1),
(2) Date: Sep. 10, 2015

(87) PCT Pub. No.: WO2014/164976
PCT Pub. Date: Oct. 9, 2014

(65) Prior Publication Data
US 2016/0043549 A1 Feb. 11, 2016

Related U.S. Application Data

(60) Provisional application No. 61/778,639, filed on Mar. 13, 2013.

(51) Int. Cl.
*H02J 3/00* (2006.01)
*H04L 29/08* (2006.01)
(Continued)

(52) U.S. Cl.
CPC ............. *H02J 3/00* (2013.01); *G05B 13/04* (2013.01); *H04L 67/12* (2013.01); *H04L 67/34* (2013.01); *H04L 69/08* (2013.01); *H02J 3/381* (2013.01); *H04L 41/0806* (2013.01); *Y02P 80/14* (2015.11); *Y04S 40/162* (2013.01)

(58) Field of Classification Search
None
See application file for complete search history.

(56) References Cited

U.S. PATENT DOCUMENTS 6,891,851 B1 * 5/2005 Demakakos ............ H04L 43/50
370/249
7,379,997 B2 5/2008 Ehlers et al.
(Continued)

OTHER PUBLICATIONS

International Search Report, PCT/US2014/023991, dated Aug. 8, 2014, pp. 3.

*Primary Examiner* — Jason Lin
(74) *Attorney, Agent, or Firm* — Chapin IP Law, LLC

(57) ABSTRACT

A system for management of distributed control and real-time data for an electric utility network having remote devices and legacy subsystems includes a distributed communications network and a plurality of nodes coupled to the distributed communications network. Each of the nodes includes a multi-protocol interface having a boundary protocol convertor comprising a protocol validation engine to validate messages and commands from the remote devices and an in-field distributed data analyzer. The multi-protocol interface provides a standard data model for the remote devices.

11 Claims, 5 Drawing Sheets

(51) Int. Cl.
*H04L 29/06* (2006.01)
*G05B 13/04* (2006.01)
*H02J 3/38* (2006.01)
*H04L 12/24* (2006.01)

(56) References Cited

U.S. PATENT DOCUMENTS

| | | |
|---|---|---|
| 8,055,743 B2 | 11/2011 | Frutiger et al. |
| 2003/0197426 A1 | 10/2003 | Carson et al. |
| 2010/0287390 A1 | 11/2010 | Yu |
| 2011/0015801 A1 | 1/2011 | Mazzarella |
| 2011/0113246 A1* | 5/2011 | Witchey ............... H04L 9/0844 713/168 |
| 2011/0282508 A1* | 11/2011 | Goutard ............... H02J 3/06 700/293 |
| 2012/0029897 A1* | 2/2012 | Cherian ............... H02J 3/00 703/18 |
| 2012/0084400 A1* | 4/2012 | Almadi ............... H04L 41/069 709/219 |
| 2012/0266209 A1* | 10/2012 | Gooding ............... H04L 63/20 726/1 |
| 2014/0039699 A1* | 2/2014 | Forbes, Jr. ............ G05B 19/02 700/286 |
| 2014/0068712 A1* | 3/2014 | Frenkel ............... H04L 63/126 726/3 |

* cited by examiner

DISTRIBUTED MICRO-GRID CONTROLLER

FIELD OF INVENTION

The present disclosure relates generally to systems for electric utilities and more specifically to management of distributed control and real-time data.

BACKGROUND

Power companies are interested in integrating more distributed energy sources, including renewable (wind and solar), non-renewable combined heat and power (CHP), and storage onto their distribution network. The desire to do so is driven by various factors; including a demand for more FIT (Feed In Tariff) interconnections, a desire for greater security of supply, and as a source of revenue for utilities in any co-owned production. Power companies are, however, limited in their capacity to do so by various constraining factors associated with the current power company infrastructures as well as constraints of the current infrastructures. These constraints are conventionally overcome with expensive equipment upgrades.

Power companies require a future-proof solution that will allow them to bridge the gap from old technology; they need a solution that will aggregate, filter and analyze data locally so that useful insight, rather than bulk data, is sent back to central servers. This solution will scale to meet the automation needs of power companies as these needs evolve. Most industrialized countries are providing power on aged power grids designed for centralized, mass generation while consumption is fragmented and local. These legacy power grids are costly to run and maintain, inefficient and prohibit the wide-scale integration of renewables. There is need for a decentralized model—conceptualized as many interconnected cells which will allow utilities to limit, manage and broker energy generation and distribution at a regional level. These fundamental changes are leading distribution companies to think more carefully about their capital upgrades and investments.

Conventional solutions approach these problems in a classic fashion of large scale data collection and central processing and control. In addition, the utility industry itself imparts a number of unique requirements and considerations on the product and business strategy including managing of a large amount of real-time data and information spread over a large geographical area. These solutions have large bandwidth requirements and associated infrastructure costs to support, in addition latency of data due to the large number of communication hops necessary and volume may limit the possible application of the gathered data (e.g., control of the power grid). The sheer volume of data being generated and the inability to process and making sense of this data complicates the interoperability of dissimilar systems and devices. In conventional systems no consistent data models exist between devices so no exchange of data is possible between systems and devices, there is no ability to simultaneously manage legacy, new and dissimilar systems, there is no ability to build control capabilities around dissimilar systems as there is no way to integrate them and there is difficulty in getting value from data coming from a collection of such dissimilar systems.

The traditional electrical power network was designed as a centralized architecture and does not readily support the connection of distributed energy assets due to power system and communication network constraints. This in turn prohibits the interconnection of additional distributed generation (e.g. renewable) and other energy resources effectively due to the lack of: a way to control different dissimilar assets cost effectively, a way to unify systems and network asset nodes in order to manage these resources, lack of secure protocols for distributed in-field systems, existing industry protocols are inherently insecure for transport over public or vulnerable networks, no system for integrating legacy protocols into a secure network, limited ability to update and deploy customized functionality to nodes over the air and no system flexibility to support innovation/applications in control, analytics and monitoring of an electrical feeder network.

SUMMARY

Embodiments disclosed herein provide an alternative to conventional centralized power grids. These embodiments include a distributed architecture which does not rely on a centralized system for data storage, processing, and control. The distributed architecture is dynamic in nature, and expects nodes and data services to both join and leave the network considered as normal rather than as an exception. Nodes are discovered, provisioned, and join the network automatically without operator intervention by self-identification through their assigned role. Automatic discovery and node provisioning enables simple integration of new devices to the network.

In one embodiment, a system for management of distributed control and real-time data for an electric utility network having remote devices and legacy subsystems includes a distributed communications network and a plurality of nodes coupled to the distributed communications network. Each of the nodes includes a multi-protocol interface having a boundary protocol convertor comprising a protocol validation engine to validate messages and commands from the remote devices and an in-field distributed data analyzer. The multi-protocol interface provides a standard data model for the remote devices. Such a system enables real-time management and control of power distribution, via embedded technology, to maximize the utilization of existing assets on the local grid for a fraction of new infrastructure costs and implementation time.

In embodiments disclosed herein, data is modeled using a standardized data model which replaces the disparate mix of proprietary client-server based systems in the field of protocols. Specific data structures are set up to mimic features of an IEC 61850 data model but optimized for distributed communications. Additional quality of service (QoS) is defined and each type of data in the model can be associated with different and unique QoS parameters for the purposes of allowing the tuning of both functionality and efficiency of each type. Data coming from external devices is converted through boundary protocol conversion. This enables the transparent inter-operability of various devices from various vendors, software, protocols, etc. Data is inspected as it both enters and exits the boundaries of the system. This provides a layer of security for inherently insecure edge protocols.

Each node can be configured as a control node, a remote node, or an instrumentation node, and the nodes collect and process data locally. Such a system enables real-time management and control of power distribution, via embedded technology, to maximize the utilization of existing assets on the local grid for a fraction of new infrastructure costs and implementation time. In one embodiment, the remote node is a lower powered equivalent to the control node. This node is designed to be installed at a managed device on the local distributed communications network, coordinating communication, management, and control with the embedded controller on the device (or group of local devices). This device will typically monitor one or several DG, storage, load, control or other energy devices with data usually fetched from a device controller over physical interfaces including, but not limited to, RS-232, RS-485, USB, or Ethernet. In order to simplify installation and connectivity, this controller is compatible with a variety of field and wide area communication architectures, including but not limited to Advanced metering infrastructure AMI networks, GPRS/GSM, WiFi, and local area network (LAN) over which it can send data back to the main controller. The instrumentation node is a device designed for cost effective, real-time signal monitoring of specific devices or processes that do not have their own high fidelity monitoring or control. This functionality can easily be integrated right into the node for powerful analysis, analytics, and management in a single package.

In one embodiment, a technique for deploying, managing, and executing analytics applications across a plurality of distributed nodes includes storing a node class configuration in a distributed repository, configuring at least one of the plurality of nodes with a configuration from the distributed configuration repository and managing the plurality of nodes. Managing the plurality of nodes includes classifying each of the plurality of nodes into a predetermined node class, assigning pre-defined roles and configurations based on classified node classes and dynamically and securely deploying new applications to the plurality of nodes. The technique facilitates the plurality of nodes performance of real-time distributed analytics and control, real-time event detection and waveform distribution and data reduction through distributed field databases.

In embodiments disclosed herein, data is shared through a publish-subscribe, peer-to-peer communication pattern in which any node may read or share data to any other discoverable node. This enables a high availability system with no single point of failure. Nodes can be dynamically configured to perform calculations in the field across any set or subset of devices. Calculations may have one or many sources and one or many resulting output data channels. The data architecture supports failover and redundancy where all data sources can be assigned a priority and the highest priority source available at any given time will be taken as truth. Additionally, data can be stored on nodes at differing resolution and queries of the data will be retrieved from the source with the highest resolution available. Real-time waveform data may be transferred between distributed devices to share instantaneous high speed sampled data captures. The peer-to-peer nature of the network allows for that waveform data to be shared to remote devices or applications without incurring significant overhead or bandwidth.

The secure distributed architecture of embodiments disclosed herein is based on a common data model and does not rely on a centralized system for data storage, processing, or control. This approach makes use of a data fabric in which data is available to all distributed devices and applications through a publish-subscribe based peer-to-peer communication pattern simplifying big data management and analytics. Data rates across the network are reduced since applications only subscribe to data which they require and devices share this data directly. Data and services are distributed throughout the network of devices and automatically discovered and provisioned. Legacy or disparate systems can be easily integrated using a common data model to enable communication among them.

BRIEF DESCRIPTION OF THE DRAWINGS

The accompanying drawings, which are incorporated in and form a part of the specification, illustrate the embodiments of the present disclosure and together with the written description serve to explain the principles, characteristics, and features of the disclosure. The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention. In the drawings.

DETAILED DESCRIPTION

Embodiments disclosed herein operate in a distributed architecture which does not rely on a centralized system for data storage, processing, and control. The distributed architecture is dynamic in nature, and expects nodes and data services to both join and leave the network considered as normal rather than as an exception. Nodes are discovered, provisioned, and join the network automatically without operator intervention by self-identification through its assigned role. Automatic discovery and node provisioning enables simple integration of new devices to the network.

Figure 1:
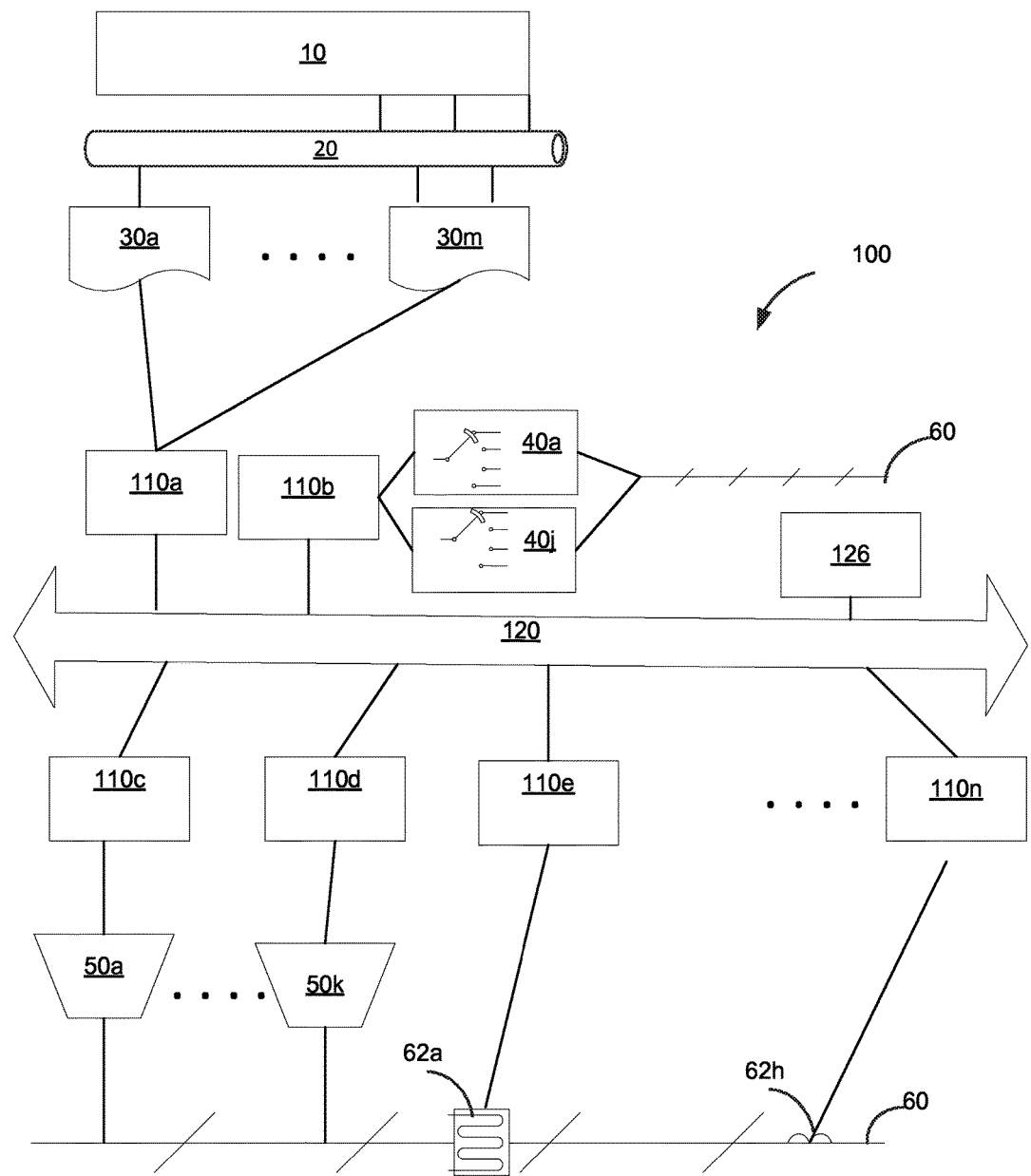
FIG. 1 is a schematic diagram of a system for management of distributed generation resources on a distributed communications network according to embodiments disclosed herein.

Now referring to FIG. 1, a system 100 for management of distributed control and real-time data for an electric utility network having remote devices 50a-50k (collectively referred to as remote devices 50) and legacy subsystems 30a-30m (collectively referred to as legacy subsystems 30) includes a distributed communications network 120 and a plurality of nodes 110a-110n (collectively referred to as nodes 110) coupled to the distributed communications network. The electric utility network includes a communications network 20 and a utility power grid 60. Typically a utility command center 10 is interconnected to the legacy subsystems 30 through the communications network 20. The system 100 also includes a real-time simulator 126 coupled to the distributed communications network 120.

The nodes 110 are coupled to the remote devices 50 and to the legacy subsystems 30. The Legacy subsystems 30 include information systems typically used in central control centers by electric utilities. The node 110 are also coupled to various control devices 40a-40j (collectively referred to as control devices 40), various remote devices 50a-50k (collectively referred to as remote devices 50) and power line instruments 62a-62h (collectively referred to as power line instruments 62) which are connected to the utility power grid 60.

In operation, the nodes 110 (described in more detail in FIG. 2 below) are distributed programmable embedded processor that coordinate communication among utility command center 10, legacy subsystems 30, control devices 40, remote devices 50 and power line instruments 62 through various industrial communications protocols, and sends aggregate data back to a centralized location or distributes the data through the distributed communications network 120. The nodes 110 can perform real-time calculations, alarming, and data logging as well as exposing a programmable API for control automation. The nodes 110 can operate autonomously and accept remote control actions to of automate levels of control in the distribution system. The distributed communications network 120 in conjunction with the nodes 110 provides a facility that allows third party devices to send information and receive data and commands/instructions and facilitates the creation, configuration, and deployment of third party control applications without requiring hardware reconfiguration or firmware changes.

The simulator 126 operates in real-time to predict and manage the efficiency of distributed power devices (e.g., remote devices 50). Real-time simulation allows for a designed calculated channel or control algorithm to be tested and validated according to manual data inputs, or live data if available. For calculated channels, it allows operators to validate output against input data. For control algorithms, it allows operators to validate control actions against input data. It is understood that simulation can be performed offline. Validation ensures the calculation or control does not conflict with another calculation or control algorithm already deployed on the device. Operators initiate simulation during design time prior to deployment.

Figure 2:
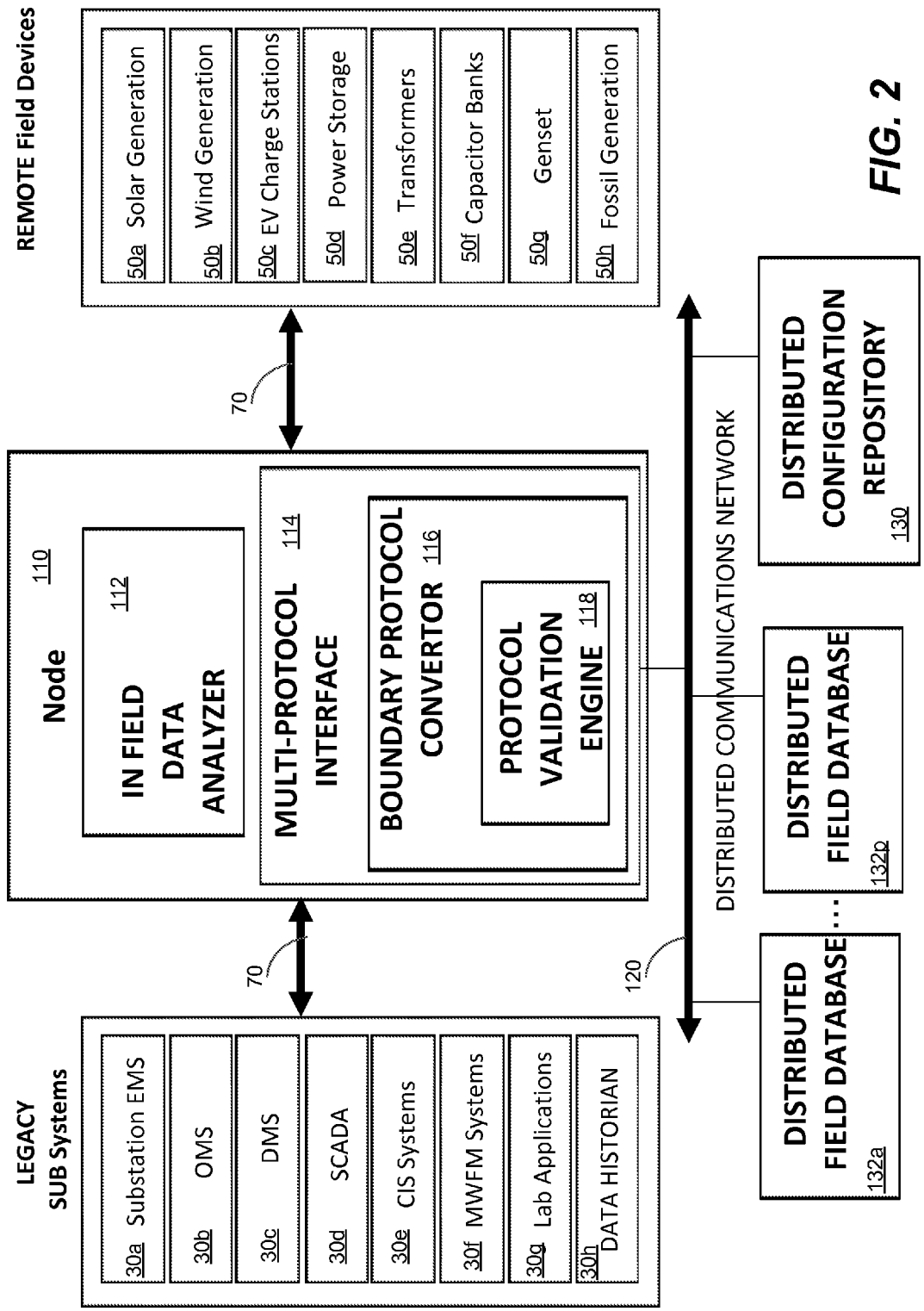
FIG. 2 shows details of the node in the system of FIG. 1.

Now referring to FIG. 2, detail on a node 110 interfaced to and legacy subsystems 30 and remote devices 50 are shown. The node 110 includes an in-field data analyzer 112 and a multi-protocol interface 114. The multi-protocol interface 114 includes a boundary protocol convertor 116 having a protocol validation engine 118 and an in-field distributed data analyzer 112. The system 100 also includes a distributed configuration repository 130. The system 100 includes distributed field databases 132a-132p (collectively referred to as distributed field databases 132) which may exist internal or external to the nodes 110. Arrows 70 represent the various protocols used within the distributed communications network 120 (also referred to as the distributed microgrid network). Here the Legacy subsystems 30 include but are not limited to, an energy management system (EMS) subsystem 30a, an outage management system (OMS) subsystem 30b, a distribution management system (DMS) subsystem 30c, a supervisory control and data acquisition (SCADA) subsystem 30d, mobile workforce management (MWFM), lab applications 30g and a data historian and archival database subsystem 30h.

In operation the multi-protocol interface 114 provides a standard data model for the remote devices. In one embodiment, data is modeled based on the IEC 61850 standard with modifications to facilitate use in a distributed system. Data channels within the system follow a hierarchical naming convention to associate channels with devices and subdevices. The protocol validation engine 118 validates messages and commands from the remote devices. The boundary protocol convertor 116 is both pluggable and extensible and integrates remote devices 50, legacy subsystems 30, control devices and power line instruments 62 through a protocol conversion engine (not shown). The boundary protocol convertor 116 handles protocols including, but not limited to, IEC 61850, DNP3, Modbus, OPC Foundation Unified Architecture (OPC UA), IEC 60870-5, Object Management Group (OMG) data distribution service (DDS) over various transport layers including but not limited to, serial and Ethernet. The pluggable architecture allows more protocol conversions to be added in the field. The protocol validation engine 118 verifies that messages and commands are received from known ones of the plurality of nodes, inspects received commands for valid syntax prior to execution when delivered from external nodes and the protocol validation engine rejects malformed messages and commands to ensure network communication stability and security. In one embodiment the protocol validation engine is a plug-in architecture which allows for well known protocols to be converted and inspected for malformed or corrupt packets.

Embodiments disclosed herein include a distributed architecture which does not rely on a centralized system for data storage, processing, and control. The distributed architecture is dynamic in nature, and expects nodes and data services to both join and leave the network being considered as normal rather than as an exception. Nodes are discovered, provisioned, and join the network automatically without operator intervention by self-identification through its assigned role. Automatic discovery and node provisioning operating in conjunction with the distributed configuration repository 130 enables simple integration of new devices to the network. Depending on which of a legacy subsystem 30, control device 40, remote device 50 and power line instrument 62 a nodes 110 is connected to, the node 110 is configured as either a control node, a remote node or an instrumentation node using the distributed configuration repository 130 and some of nodes are configured to collect and processes data locally.

Data is modeled using a standardized data model which replaces the disparate mix of proprietary client-server based systems in the field of protocols. Specific data structures are set up to mimic features of an IEC 61850 data model but optimized for distributed communications.

Additional quality of service (QoS) is defined and each type of data in the model can be associated with different and unique QoS parameters. Data coming from external devices is converted through boundary protocol conversion. This enables the transparent inter-operability of various devices from various venders, software, protocols, etc. Data is inspected as it both enters and exits the boundaries of the system. This provides a layer of security for inherently insecure edge protocols.

Data is shared through a publish-subscribe, peer-to-peer communication pattern in which any node may read or share data to any other discoverable node. This enables a high availability system with no single point of failure. Nodes can be dynamically configured to perform calculations in the field across any set or subset of devices. Calculations may have one or many sources and one or many resulting output data channels. The data architecture supports failover and redundancy where all data sources can be assigned a priority and the highest priority source available at any given time will be taken as truth. Additionally, data can be stored on nodes at differing resolution and queries of the data will be retrieved from sources of the highest resolution possible. Real-time waveform data may be transferred between distributed devices to share instantaneous high speed sampled data captures. The peer-to-peer nature of the network allows for that waveform data to be shared to remote devices or applications without incurring significant overhead or bandwidth.

The in-field data analyzer 112 saves bandwidth by performing data analysis on-device (i.e., a device attached to a node) in the field. The in-field data analyzer 112 creates complex multi-device distributed analytics without incurring server overhead and shares high speed raw measured values as well as parametric data between devices. Simple deployment of analytics modules includes, but is not limited to, pre-packaged options for power quality analyzer (PQA)/power quality monitor (PQM), phasor measurement unit (PMU), and digital fault recorder (DNR).

The in-field data analyzer 112 includes an application programming interface (API) to access and process locally collected data, for reporting and event detection on the state of local distribution network and devices. In some embodiments a "data diode" is used as a mechanism to help secure the various networks from each other. The data diode restricts the flow of information, between networks, to a single direction. One-way transfer of information, especially when transferred from the secure network to the less secure network, reduces the possibility of exploits significantly. In using the data diode all information sent between networks uses connectionless protocols (e.g. UDP) to work across the diode (note that this introduces restrictions on the protocols and equipment that can be used, and adds complexity to the solution) and error correction/retransmission of data would be very limited (features would depend on the chosen implementation, but would typically be limited to keep-alive and data redundancy encoding mechanisms). The assumption of unidirectional data flows makes effectively exploiting a link between networks difficult though not impossible. It does substantially increase the challenge. Designing data transfers using connectionless protocols allows utilities to use a broad range of devices to implement data diode functionality depending on their security and reliability requirements. IEC 61850 includes connectionless protocol implementations. In one embodiment, the in-field data analyzer 112 uses the analytical capabilities in National Instruments LabVIEW.

The distributed communications network 120 provides:
user authentication on the operating system to secure the device at the root level;
device authentication to secure connections between devices;
application authentication and permission for data access to restrict individual application access on the network; and
encrypted databases and configuration files to secure physical access.
Existing Supervisory Control and Data Acquisition (SCADA) devices (i.e., remote devices) are secured by converting outdated edge devices protocols to a secure network protocol. The distributed communications network 120 and corresponding communication and network architecture is designed to secure the network from the inside out, not relying on just the firewall.

Figure 3:
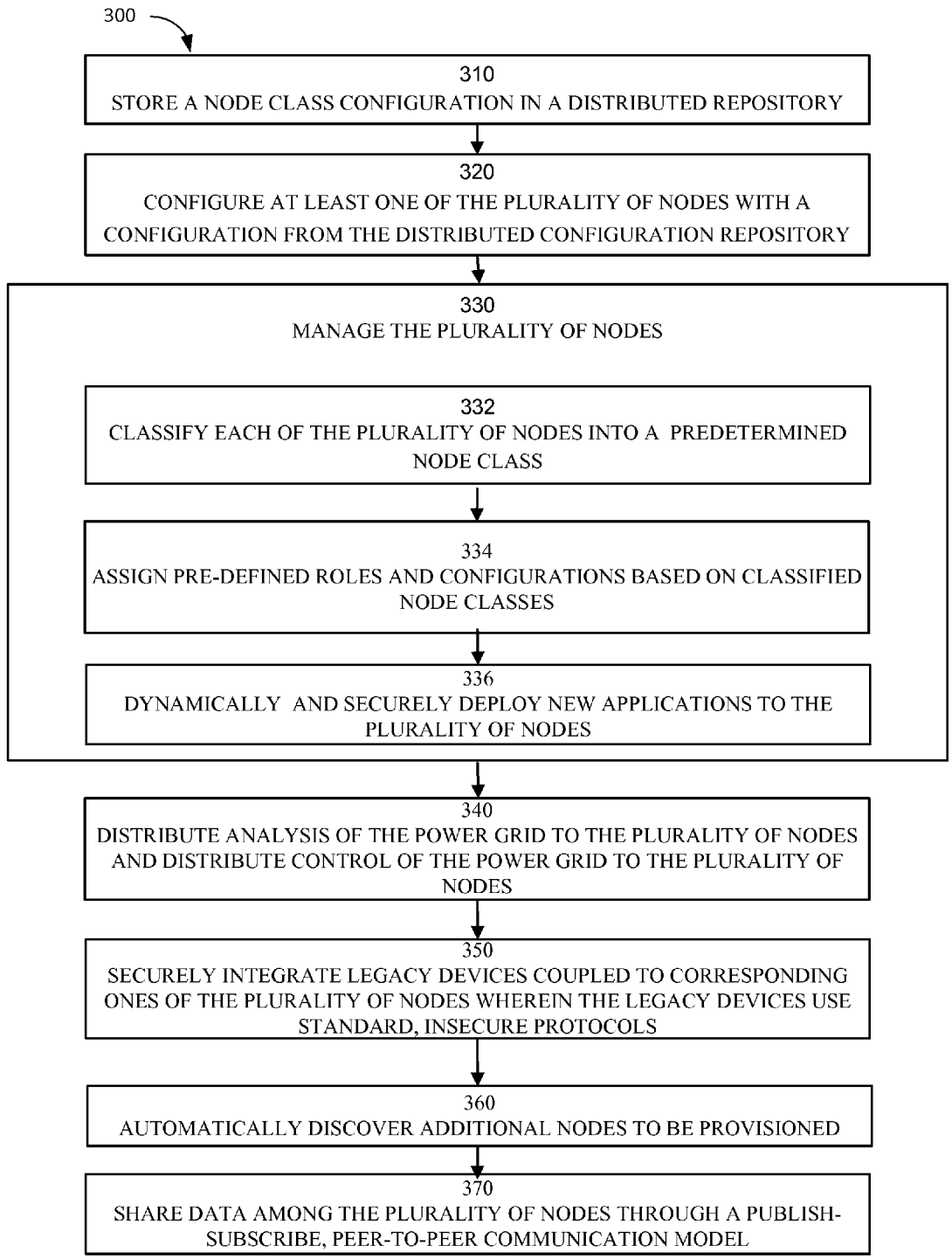
FIG. 3 is a flow chart of processing steps performed to deploy, manage, and execute analytics applications across a plurality of distributed nodes in accordance with embodiments disclosed herein.

In FIG. 3, flowchart 300 diagrams the overall process of deploying, managing, and executing analytics applications across a plurality of distributed nodes. In step 310 a node class configuration is stored in a distributed repository along with a list of unique node identifiers associated with that class. Node classes provide a description of required data channels, calculations, events, and communications interfaces required to accomplish its respective tasks. Once node classes are defined, a list of unique node identifiers is manually configured which define all devices under each node class. As nodes 110 join the network, the nodes 110 look up the corresponding unique node identifiers in the distributed configuration repository 130 and retrieve the respective configurations.

In step 320, at least one of the plurality of nodes is configured with a configuration from the distributed configuration repository based on the node's unique node identifier. Each node can be configured to be a control node, a remote node or an instrumentation node depending on function and hardware configuration of the node.

In step 330 the plurality of nodes are managed in the following steps. In step 332, each of the plurality of nodes is classified into a predetermined node class based on each node's unique node identifier. In step 334, pre-defined roles and configurations based on classified node classes are assigned to each one of the plurality of nodes. Newly deployed applications retrieve configurations and resolve data dependencies from other nodes in the distributed network and automatically provision themselves into the distributed network.

In step 336, new applications and configurations are dynamically and securely deployed to the plurality of nodes. In one embodiment, the plurality of nodes perform real-time distributed analytics and control, real-time event detection and waveform distribution and data reduction through distributed field databases.

In step 340, analysis of the power grid is distributed to the plurality of nodes and control of the power grid is distributed to the plurality of nodes. In step 350, legacy devices are securely integrated and coupled to corresponding ones of the plurality of nodes. This step secures the legacy devices which use standard, insecure protocols. In step 360, additional nodes to be provisioned are automatically discovered. Finally in step 370, data is shared among the plurality of nodes through a publish-subscribe, peer-to-peer communication model. Data is published to a common data bus to which other nodes may dynamically subscribe to on an as needed basis. Once a node subscribes to a particular data channel, a peer-to-peer link is created and maintained between the nodes until either node leaves the network or unsubscribes from the data channel.

In one embodiment, the nodes 110 use a Grid operating system. The Grid operating system provides a set of foundation services along with a programming API that allows for the building of custom applications (like distributed generation management, or microgrid control). The Grid operating system software runs on field installed hardware to rapidly deploy monitoring, analytic and control solutions that are designed to solve distribution problems at the local and regional level.

Figure 4:
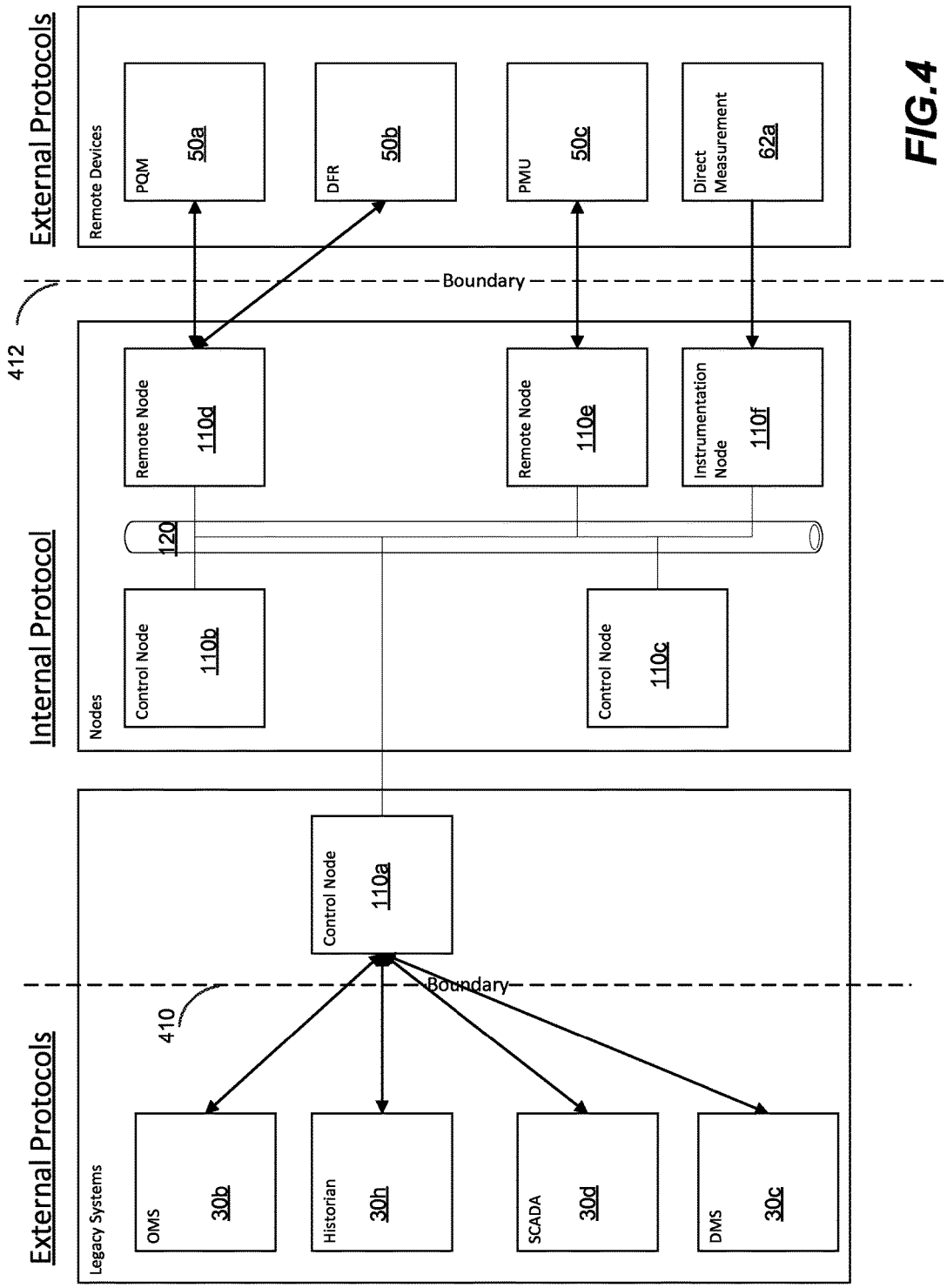
FIG. 4 is a schematic diagram showing details of boundary protocol converter converting external communication protocols for transport across the distributed communications network according to embodiments disclosed herein.

FIG. 4 is a schematic diagram showing details of boundary protocol converter converting external communication protocols for transport across the distributed communications network.

In embodiments of system 100, there is a communications virtual boundary 410 which separates legacy systems 30b, 30c, 30d and 30h from node 110a, here a control node. It is understood that a single node can communicate with multiple legacy systems or that multiple nodes can communicate with multiple legacy systems. Communications virtual boundary 412 separates remote devices 50 from nodes 110d and 110e, here remote nodes. The remote nodes can communicate with one or more remote devices. Remote devices include, but are not limited to, a power quality monitor (PQM) 50a, digital fault recorder (DFR) 50b, phasor measurement unit (PMU) 50c. The communications virtual boundary 412 also separates instruments 62 from node 110f, here, an instrumentation node. The instrumentation node can communicate with one or more instruments such as a power line monitor (PLM) and a transformer monitor (TFM). An internal protocol is used within the communications virtual boundaries 410 and 412, and various external protocols (some industry standard and others proprietary protocols) are used outside the communications virtual boundaries 410 and 412.

Figure 5:
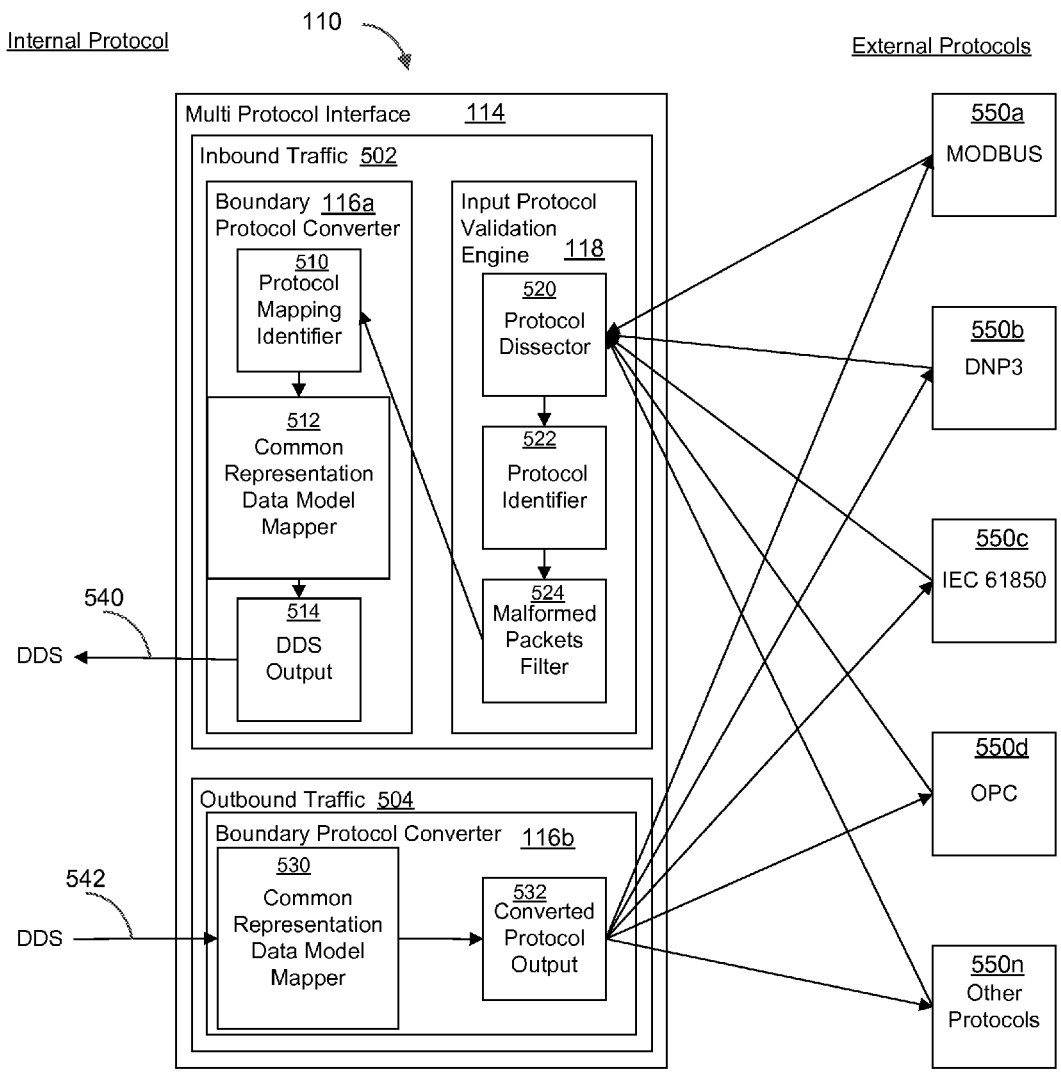
FIG. 5 is a schematic diagram showing details of the multi-protocol interface, the boundary protocol convertor and the protocol validation engine of FIG. 2.

Now referring to FIG. 5, the multi-protocol interface 114 of node 110 includes an inbound traffic component 502 and an outbound traffic component 504. A boundary protocol convertor 116*a* of the inbound traffic component 502 includes a protocol mapping identifier 510, a common representation data model mapper 512 and a DDS output module. The protocol validation engine 118 of the inbound traffic component 502 includes a protocol dissector 520, a protocol identifier 522 and a malformed packets filter 524. A boundary protocol convertor 116*b* of the outbound traffic component 504 includes a common representation data model mapper 530 and a converted protocol output module 532.

In operation, messages including collected data, command and control in multiple protocols from systems external to the distributed data network 120 are protocol converted at the boundary of entering or exiting the distributed data network 120. Remote devices typically communicate to a central server but embodiments disclosed herein intercept these communications and make it available to a publish-subscribe communication model so that other devices in the distributed data network 120 can make use of the data without actually being a server. Legacy systems (e.g., SCADA, Historian, OMS, DMS, etc.) communicate over either proprietary protocols or one of the known industrial protocols such as Modbus® 550*a*, Distributed Network Protocol 3 (DNP3) 550*b*, International Electrotechnical Commission (IEC) 61850 550*c*, object linking and embedding for process control (OPC) 550*d* and other standard and proprietary protocols 550*n*. The multi-protocol interface 114 converts these protocols 550*a*-550*n* to a common data model in order to share this data between legacy systems. Since remote devices, instruments, and legacy subsystems produce and consume data which are typically not in a common data format, they normally cannot communicate with one another. By converting both inbound and outbound traffic and publishing the data, the various devices and systems connected to the distributed communications network 120 through the plurality of nodes 110 can share data and provide control of distributed resources.

In operation, the protocol validation engine 118 receives an inbound packet (e.g., a data message), dissects the packet, identifies the protocol if possible and filters out corrupt, malformed or unidentifiable packets. In this manner, bad, unknown, or unexpected packets are filtered out of any data, message or command before protocol conversion is attempted. After an inbound message has been validated, a known protocol mapping is identified. The identified protocol is then mapped into the common representation data model. Finally, the DDS protocol 540 is used output the data to the distributed communications network 120 using publish-subscribe.

Outbound traffic is mapped from the DDS protocol 542 to the common representation data model and then converted to an external protocol as a function of the remote device, legacy subsystem or instrument to which it is directed. In one embodiment, the protocol conversion to apply is configured by a user.

System 100 may have application to other industries where there is a need to manage and optimize the utility or performance of a set of assets (e.g., the oil and gas industry monitoring, management and analytics information from pipeline and production assets). These solutions could also apply to large scale industrial applications with separate systems and assets across their plant.

While this invention has been particularly shown and described with references to preferred embodiments thereof, it will be understood by those skilled in the art that various changes in form and details (including hub and tube geometries) may be made therein without departing from the spirit and scope of the present application as defined by the appended claims. Such variations are intended to be covered by the scope of this present application. As such, the foregoing description of embodiments of the present application is not intended to be limiting, the full scope rather being conveyed by the appended claims.

What is claimed is:

1. A system for management of distributed control and real-time data for an electric utility network having remote devices and legacy subsystems comprising:
    a distributed communications network;
    a plurality of nodes coupled to the distributed communications network, each node comprising:
        a multi-protocol interface having a boundary protocol converter comprising a protocol validation engine to validate messages and commands from the remote devices; wherein the boundary protocol converter includes a protocol mapping identifier; a common representation data model mapper; and a Data Distribution Service (DDS) output module;
        an in-field distributed power grid data analyzer; and
        wherein the multi-protocol interface provides a standard data model for the remote devices;
    wherein the remote devices are legacy devices; and
    wherein a power grid is controlled by the system.

2. The system of claim 1, wherein the protocol validation engine verifies messages and commands that are received are from known ones of the plurality of nodes;
    wherein the protocol validation engine inspects received commands for valid syntax prior to execution when delivered from external nodes; and
    wherein the protocol validation engine rejects malformed messages and commands to ensure network communication stability and security.

3. The system of claim 1, wherein the boundary protocol converter converts external communication protocols to a Data Distribution Service (DDS) protocol for transport across the distributed communications network.

4. The system of claim 1, wherein the boundary protocol converter translates inter network communications using DDS to formats compatible with external nodes upon one of:
    entering the distributed network; and
    exiting from the distributed network.

5. The system of claim 1, wherein each of the plurality of nodes is configured as at least one of:
    a control node;
    a remote node;
    an instrumentation node; and
    wherein predetermined ones of the plurality of nodes collects and processes data locally.

6. The system of claim 1 further comprising a distributed processing network simulator for real-time simulation of one of a power grid comprising the distributed communications network, the plurality of nodes, the remote devices and the legacy subsystems.

7. The system of claim 1, wherein the in-field distributed data analyzer and boundary protocol converter integrates with legacy subsystems including at least one of:
- an outage management system (OMS) subsystem;
- an energy management system (EMS) subsystem
- a distribution management system (DMS) subsystem; and
- a data historian and archival database subsystem.

8. The system of claim 1 wherein the communication network in conjunction with the protocol validation engine is adapted to securely integrate legacy devices that use standard, insecure protocols, and
- wherein at least one node connects with an insecure protocol to a remote device comprising one of:
- a generation monitoring device;
- a metering device;
- a power quality monitor; and
- a generation control device.

9. The system of claim 1, wherein each of the plurality of nodes further comprises an in-field distributed controller.

10. The system of claim 1, wherein the protocol validation engine comprises:
- a protocol dissector;
- a protocol identifier; and
- a malformed packets filter.

11. The system of claim 1, wherein in-field distributed data analyzer includes at least one of:
- a power quality analyzer (PQA);
- a power quality monitor (PQM);
- a phasor measurement unit (PMU); and
- a digital fault recorder (DFR).

* * * * *